United States Patent [19]
Chao

[11] Patent Number: 6,010,260
[45] Date of Patent: Jan. 4, 2000

[54] KEYBOARD WITH EASILY ACCESSED "BACKSPACE" KEY AND "DELETE" KEY

[75] Inventor: Shih-Hung Chao, Taoyuan, Taiwan

[73] Assignee: Acer Peripherals Inc., Taoyuan, Taiwan

[21] Appl. No.: 09/192,149

[22] Filed: Nov. 13, 1998

[30] Foreign Application Priority Data

Apr. 16, 1998 [TW] Taiwan ................... 87205708

[51] Int. Cl.$^7$ .................................. B41J 5/08
[52] U.S. Cl. ............................ 400/489; 400/472
[58] Field of Search ................... 400/489, 486, 400/472; 341/21, 22, 23; 361/680; 345/168, 156; D14/115

[56] References Cited

U.S. PATENT DOCUMENTS

| | | | |
|---|---|---|---|
| 4,536,160 | 8/1985 | Hatfield | 434/227 |
| 4,823,294 | 4/1989 | Rouhani | 400/486 |
| 4,974,183 | 11/1990 | Miller | 400/489 |
| 5,143,462 | 9/1992 | Klauber | 400/486 |
| 5,334,976 | 8/1994 | Wang | 341/22 |
| 5,448,446 | 9/1995 | Honda et al. | 361/680 |
| 5,452,960 | 9/1995 | Kuhlenschmidt | 341/22 |
| 5,458,425 | 10/1995 | Torok | 400/489 |
| 5,497,151 | 3/1996 | Dombroski | 341/22 |

OTHER PUBLICATIONS

One–page keyboard diagram, marked "DEC VT100", found at website: http://www.pfu.co.jp/hhkeyboard/kb_collection/vt100.gif.

One–page keyboard diagram, marked "SHARP MZ–2500", found at website: http://www.pfu.co.jp/hhkeyboard/kb_collection/mz–2500.gif.

One–page keyboard diagram, marked "J. OASYS 100" found at website: http://www.pfu.co.jp/hhkeyboard/kb_collection/oasys 100.gif.

One–page keyboard diagram, marked "J. OASYS 100F", found at website: http://www.pfu.co.jp/hhkeyboard/kb_collection/oasys 100f.gif.

One–page keyboard diagram, marked "J. OASYS 100h x2", found at website: http://www.pfu.co.jp/hhkeyboard/kb_collection/oasys 100hx2.gif.

One–page keyboard diagram, marked "APPLE EMATE", found at website: http://www.pfu.co.jp/hhkeyboard/kb_collection/emate.gif.

*Primary Examiner*—Ren Yan
*Assistant Examiner*—Anthony H. Nguyen
*Attorney, Agent, or Firm*—Majestic, Parsons, Siebert & Hsue P.C.

[57] ABSTRACT

A keyboard comprising a plurality of Alpha-Numeric keys, a plurality of Direction keys and a Backspace key, a Delete key or a Enter key is provided. The plurality of Direction keys includes →,←,↑,↓ keys to form an area of Direction keys. The Backspace key, a Delete key or a Enter key is disposed adjacent to the area of Direction keys for allowing a user's fingers to move between Direction keys and Backspace key, a Delete key or a Enter key without moving the palm.

2 Claims, 1 Drawing Sheet

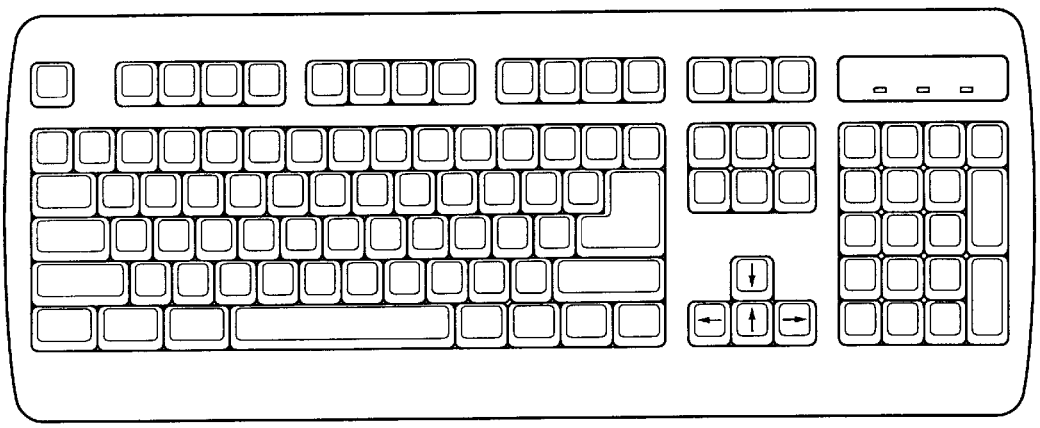
FIG._1 *(PRIOR ART)*
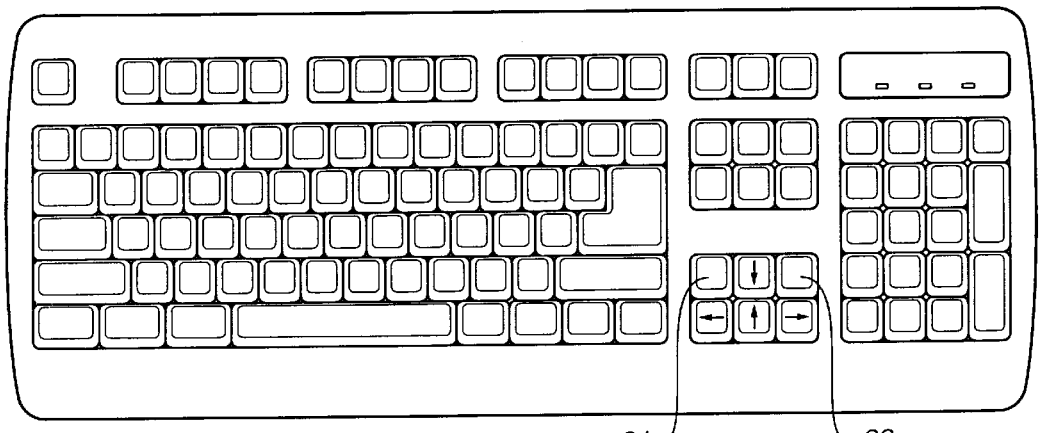
FIG._2
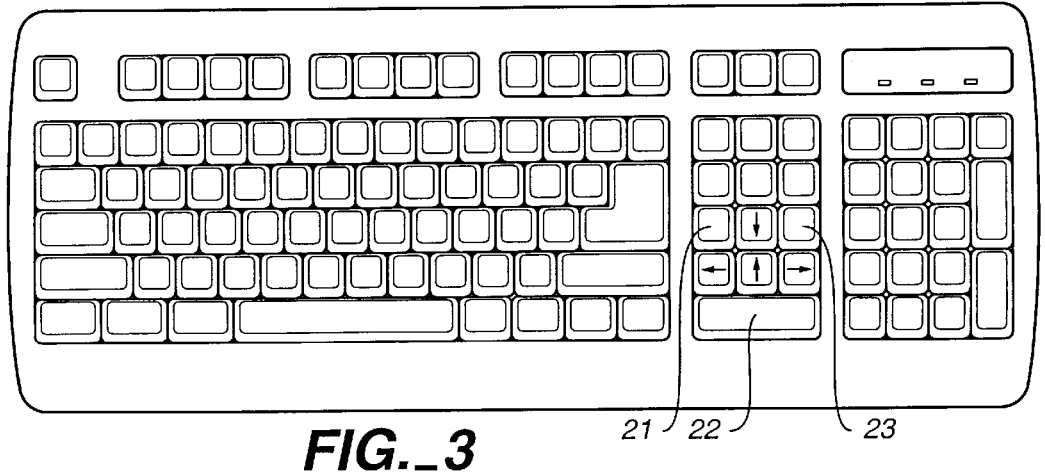
FIG._3

KEYBOARD WITH EASILY ACCESSED "BACKSPACE" KEY AND "DELETE" KEY

FIELD OF INVENTION

The invention relates to the "Backspace" key, "Delete" key and/or "Enter" key of keyboard.

BACKGROUND OF INVENTION

The keyboard device for computer or electric typewriter in general includes a plurality of Alpha-Numeric keys. Within the Alpha-Numeric keys, the "Backspace" key may move backward the cursor to a desired location on the screen and, in addition, perform the deletion function during the backward movement. The "Delete" key, on the other hand, performs the deletion function over the content where the cursor is pointed to. The "Enter" key, on the other hand, inserts and End Mark of a paragraph where the cursor is pointed to and a new line is created. In a Chinese input system, the "Enter" key performs the input of the Chinese character into the computer system.

There are defects of ergonomics in connection with the conventional keyboards during operation. These defects have caused inconvenience when the user manipulates the "Backspace" key or "Delete" key or other functional keys. As a result, keyboard with new layout is designed and awarded respectively the U.S. Pat. Nos. 5,143,462 and 4,974,183.

Besides, in general, during a word processor session, one uses "Direction" keys, i.e. ↑←↓→ keys, to move the cursor to a desired location, and afterwards input new content. One anther purpose of using the "Direction" keys is to correct the mistakes in the document. When this need arises, under the current technology, the right hand must move to the location of the "Backspace" key, and performs the backward movement of cursor and at the same time performs the deletion operation. Or, alternatively, the right hand must move to the location of the "Delete" key, and performs the forward movement of cursor and at the same time performs the deletion operation. It is obvious that those operations requires the movement of the palm and it is inconvenient.

SUMMARY OF INVENTION

The main object of the invention is to provide a new keyboard layout which allows the finger of the user reaches the "Direction" keys, "Backspace" key, and the "Delete" key easily.

The another object of the invention is to save the time spent on the movement of the fingers between keys of the keyboard during data processing session.

A keyboard including a plurality of alpha-numeric keys; a plurality of Direction keys, and a Backspace key is provided. The plurality of Direction keys includes →,←,↑,↓ keys to form an area of Direction keys. The Backspace key is adjacent to the area of Direction keys for allowing a user's fingers to move between Direction keys and Backspace key without moving the palm.

In accordance with another embodiment, a keyboard including a plurality of alpha-numeric keys; a plurality of Direction keys, a Delete key, a Backspace key and a Enter is provided. The plurality of Direction keys includes →,←, ↑,↓ keys to form an area of Direction keys. The Delete key, the Backspace key and the Enter key are adjacent to the area of Direction keys for allowing a user's fingers to move between Direction keys, the Delete key, the Backspace key and the Enter key without moving the palm.

BRIEF DESCRIPTION OF THE DRAWINGS

FIG. 1 shows the layout of a conventional keyboard.

FIG. 2 shows a preferred embodiment.

FIG. 3 shows another embodiment of the invention.

DETAILED DESCRIPTIONS OF THE INVENTION

As shown in FIG. 2, the present invention, same as the conventional approach, provides "Direction" keys, i.e. ↑←↓→ keys, at the right hand side of the "Enter" key.

Furthermore, the present invention provides a "Backspace" key 21 and a "Delete" key 23 at the vicinity of the "Direction" keys. In the embodiment shown in FIG. 2, the "Backspace" key 21 is located upper to the ← key and left to the ↑ key. The "Delete" key is located right to the ↑ key and upper to the → key. It is to be noted, under the inventive spirit of the invention, opposite arrangement may be devised. That is, the "Delete" key is located upper to the ← key and left to the ↑ key. The "Backspace" key is located right to the ↑ key and upper to the → key. From FIG. 2, it is known that without moving his palm the user may manipulate the "Direction" keys, "Backspace" key, and "Delete" key by moving only his fingers. The invention totally meet the requirement of ergonomics.

As shown in the embodiment of FIG. 3, in addition to the "Backspace" key and "Delete" key of FIG. 2, a "Enter" key is provided below the "Direction" keys area. Therefore, as some editing operations are completed and new line is to be fed by hitting the "Enter" key, small range of finger movement is only needed to reach the "Enter" key. With the conventional approach, large movement of the palm is usually required to reach the location of the "Enter" key. It is obvious that any single one of the Enter, Backspace and Delete key may be arranged adjacent to the "Direction" key regions while FIG. 3 shows that all of the Enter, Backspace and Delete key are arranged adjacent to the "Direction" key area.

It is readily known, through the provision of the invention, immediately after the user manipulate the "Direction" keys, without the large movement of palm of the user, the user may immediately manipulate the "Backspace" key, "Enter" key or "Delete" key.

It is readily known, through the provision of the invention, after the user manipulate the "Direction" keys, without the effort of the user's eyes seeking the location of "Backspace" key or "Delete" key, the user may immediately manipulate the "Backspace" key or "Delete" key. This arrangement speeds up the key-in operation of data processing.

What is claimed is:

1. A keyboard comprising:

a plurality of alpha-numeric keys;

a plurality of Direction keys, the plurality of Direction keys comprising →,←,↑,↓ keys, wherein a first key, a second key and a third key of the Direction keys are arranged in a row defining one mid Direction key in the row, and a fourth key of the Direction keys is positioned immediately adjacent to said mid Direction key;

a Backspace key immediately adjacent to the fourth key of the Direction keys and at least one of the first, second and third keys of the Direction keys.

2. The keyboard of claim 1, wherein the fourth key of the Direction keys is a ↑ key.

* * * * *